Nov. 2, 1965  O. HENDRICKSON  3,214,823
FLUID ACTUATED FILING MACHINE
Filed May 29, 1962  5 Sheets-Sheet 1
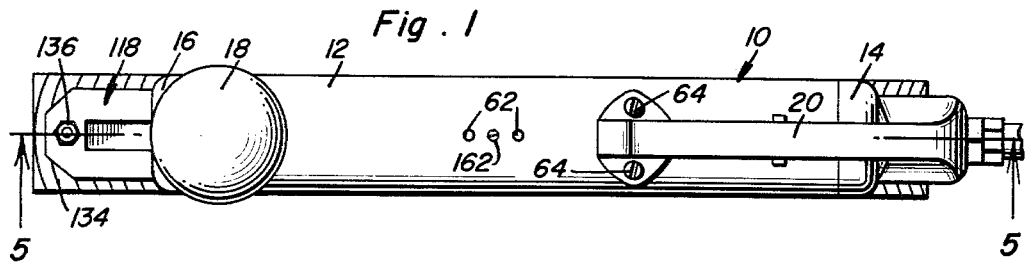
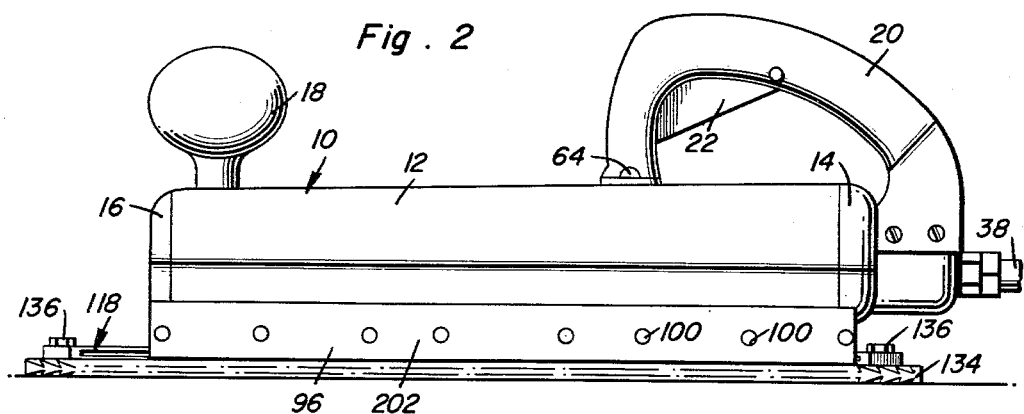
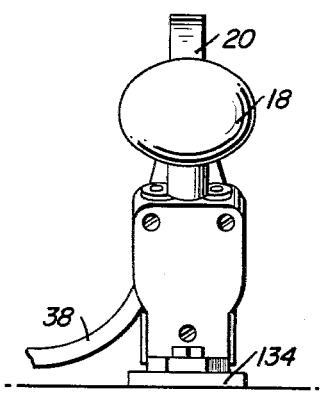
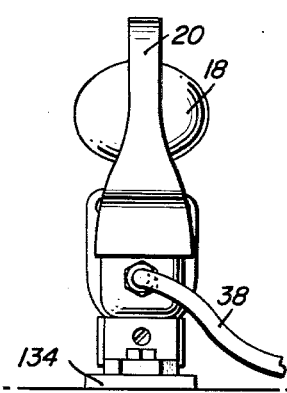
Otto Hendrickson
INVENTOR.

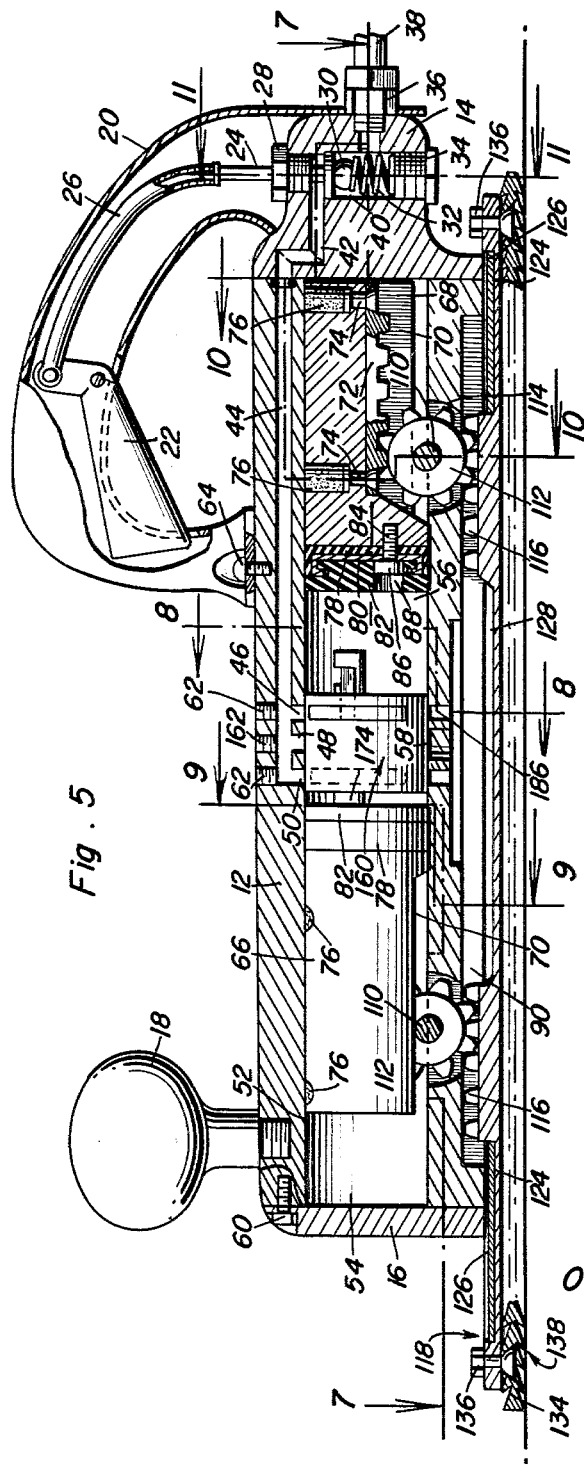

Nov. 2, 1965
O. HENDRICKSON
3,214,823
FLUID ACTUATED FILING MACHINE
Filed May 29, 1962
5 Sheets-Sheet 3
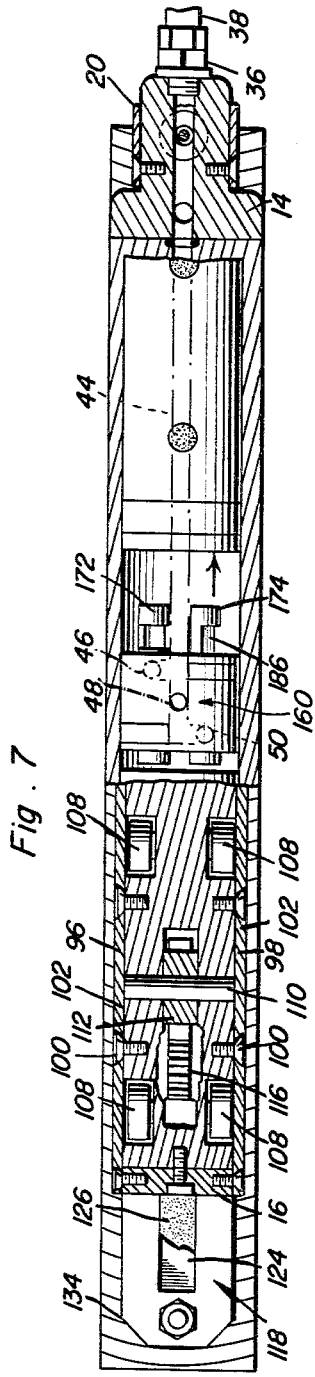
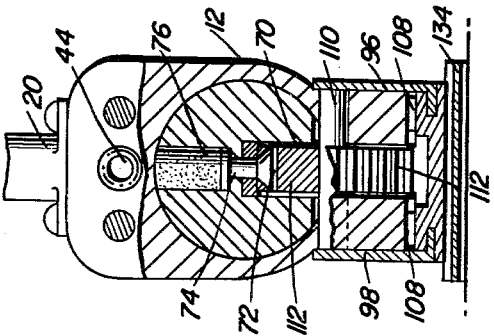
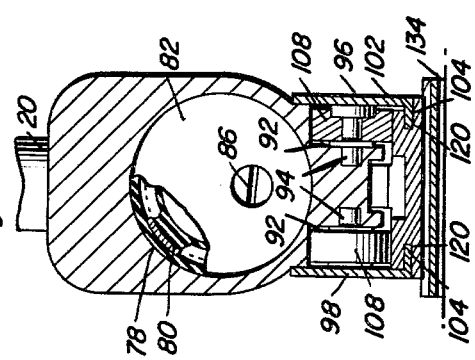
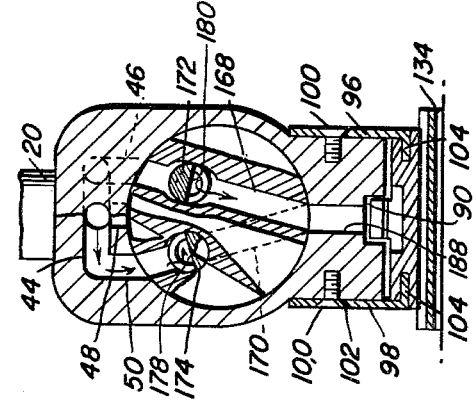
Otto Hendrickson
INVENTOR.
BY *Clarence A. O'Brien*
*and Harvey B. Jacobson*
Attorneys

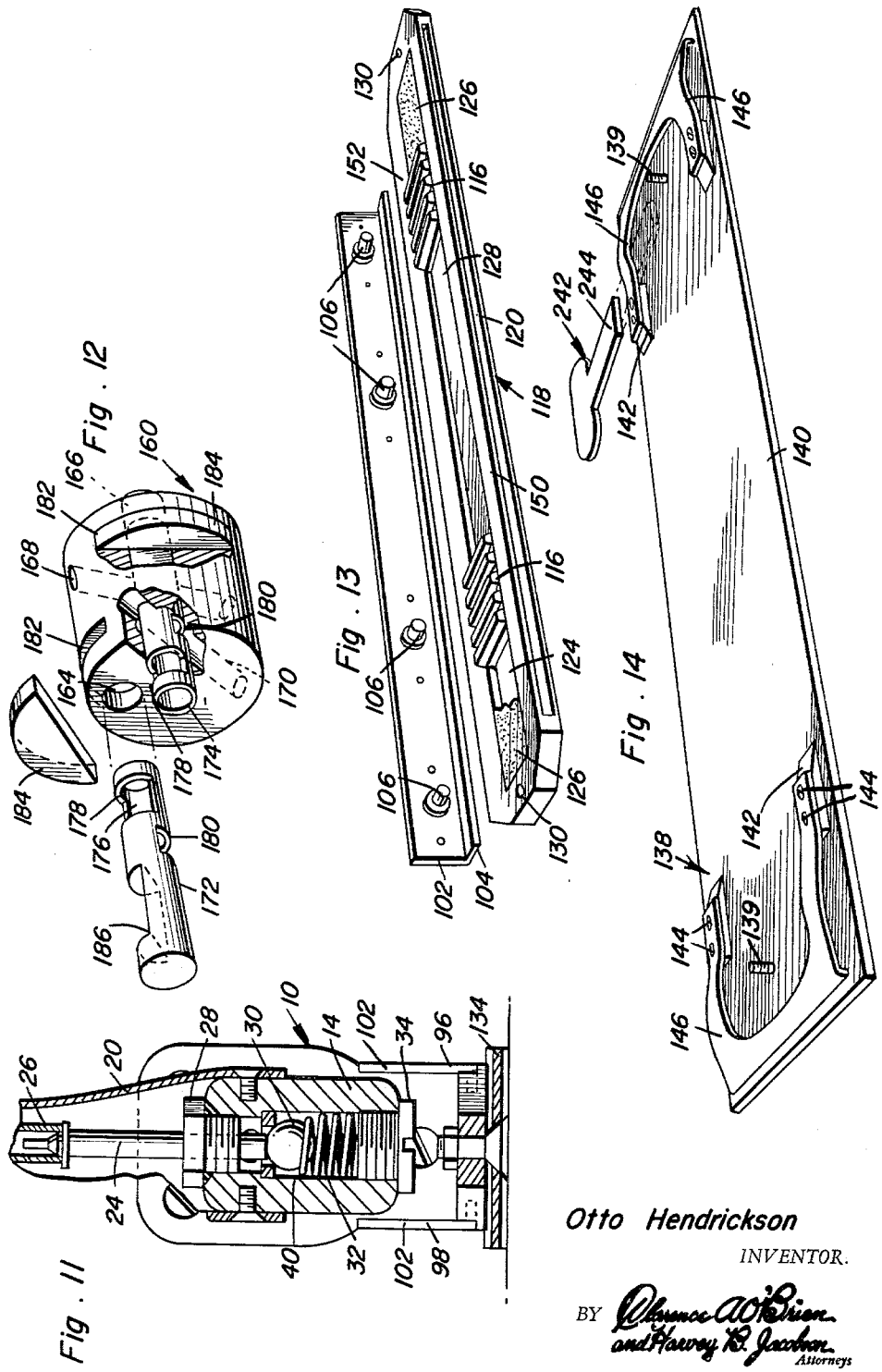

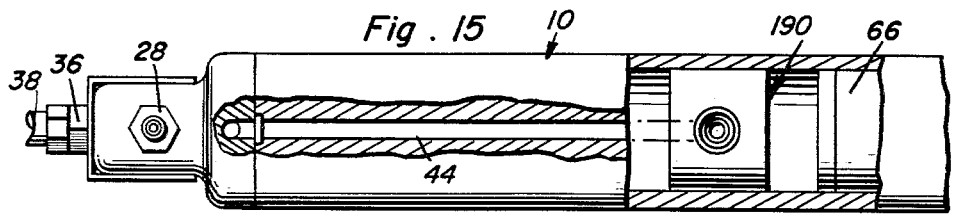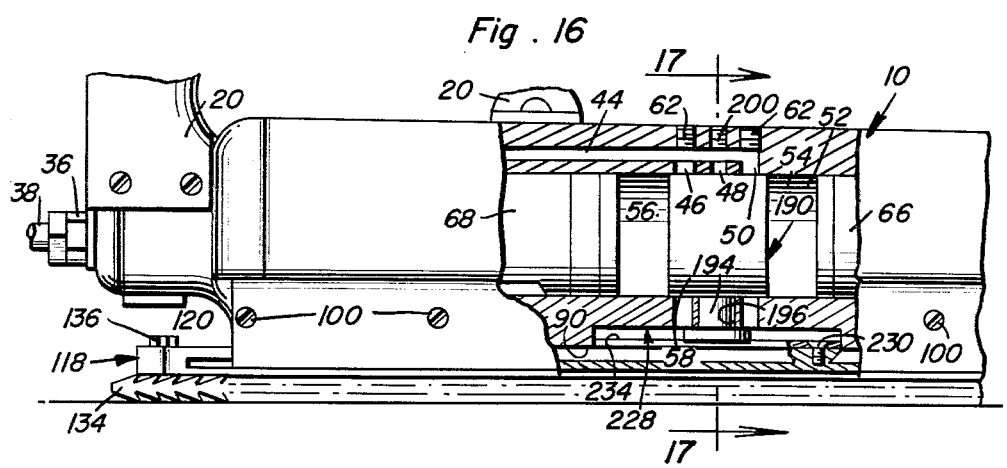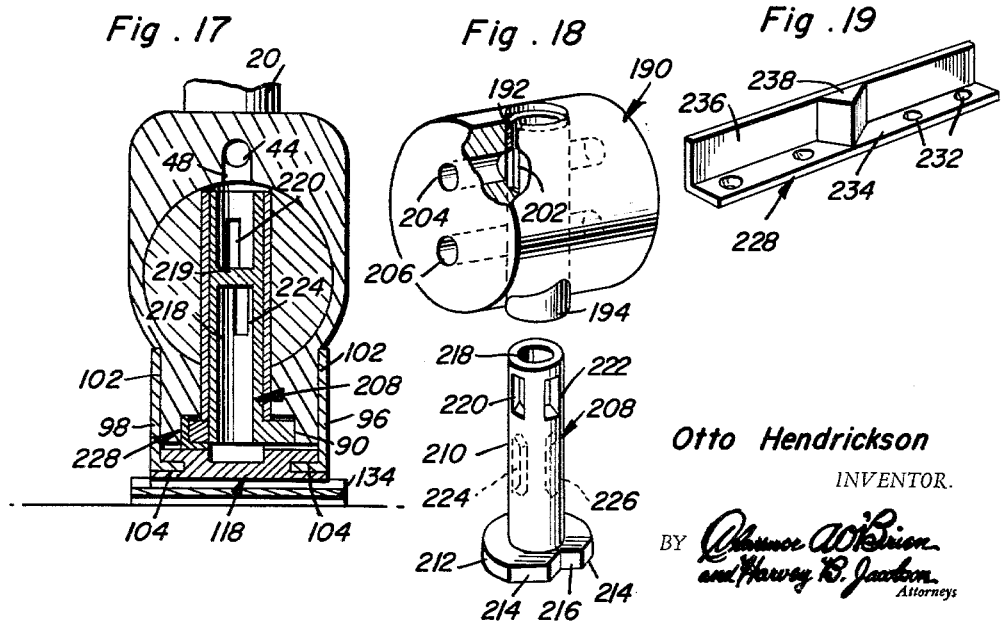

3,214,823
FLUID ACTUATED FILING MACHINE
Otto Hendrickson, Azusa, Calif., assignor of thirty-three and one-third percent to Al Lohbeck, Arcadia, Calif.
Filed May 29, 1962, Ser. No. 198,564
15 Claims. (Cl. 29—76)

This invention relates to a novel and useful pneumatic filing machine and more specifically to a filing machine which has been specifically designed to provide a motorized filing machine which will be capable of operation with a minimum amount of vibration.

The pneumatic filing machine of the instant invention has been primarily designed to provide a motorized filing tool which may operate with a minimum amount of vibration so as to be particularly well adapted for facilitating the repair of dented vehicle bodies. In addition to being useful as a filing machine, the machine of the instant invention includes a tool carrier to which tools other than files may be secured. In this manner, sandpaper and other abrasives may also be used in addition to files.

The filing machine of the instant invention, by providing a means whereby a body file or the like may be reciprocated with a minimum amount of vibration, enables a body repairman to rapidly complete jobs in an efficient manner which would otherwise necessitate being completed by hand and thus require a considerable longer period of time to complete.

The filing machine of the instant invention is capable of reciprocating the body file mounted thereon at high speed and inasmuch as vibration is held at a minimum, the filing machine may be applied to a work surface such as a sheet metal body section with little danger of damaging surrounding portions of the body section being repaired. In addition, inasmuch as the filing machine of the instant invention is capable of reciprocating files at high speed and with a minimum amount of vibration, a body mechanic handling the filing machine may effectively apply light pressure on the filing machine. If the filing machine is applied lightly to a sheet metal section having body lead applied thereto, the high speed reciprocation of the file mounted on the machine will cause the sheet metal body portion to expand more than the body lead applied thereto. Accordingly, the harder sheet metal section is raised ever so slightly which results in an extremely smoothly finished surface when the sheet metal body section cools. Normally, a body file will remove more of the leaded portion of the sheet metal panel and thus cause a slight depression in the leaded portion in the panel. By applying only light pressure on the filing machine the portions of sheet metal surrounding a leaded area will be raised slightly due to being heated by the friction of the file on the sheet metal thereby enabling the repaired body panel to have an extremely smooth and unrippled surface when cooled.

In addition to being constructed in a manner whereby the filing machine may operate with a minimum amount of vibration, the filing machine is also constructed in a manner whereby the body file reciprocated thereby, when engaged with a work surface, will not cause the body of the filing machine to buck. The reduction of the bucking of the filing machine and the ability of the filing machine to operate with a minimum amount of vibration greatly facilitates the completion of more exact filing operations inasmuch as the filing machine is easier to handle.

The main object of this invention is to provide a fluid actuating filing machine which may be utilized effectively to reciprocate a body file at high speed and with a minimum amount of vibration.

A further object of this invention is to provide a fluid actuated filing machine in accordance with the preceding object which is constructed in a manner whereby bucking of the filing machine when engaged with a work surface will be maintained at a minimum.

Another object of this invention is to provide a fluid actuated filing machine having a pair of cylinder bores disposed end to end with reciprocal pistons therein mounted for equal and simultaneous reciprocation and for reciprocation inversely relative to the file being reciprocated by the filing machine. In this manner, vibration and bucking of the filing machine is maintained at a minimum.

A still further object of this invention is to provide fluid pressure intake and exhaust means disposed between the cylinder bores in which the pistons are reciprocal and including movable valve member means engageable by adjacent end portions of the piston for actuation by the pistons in direct response to reciprocation of the latter.

Another object of this invention is to provide a fluid actuated filing machine having a tool carrier to which a body file may be removably secured whereby work engaging tools other than body files may be secured to the tool carrier of the filing machine and reciprocated thereby.

A still further object of this invention, in accordance with the immediately preceding object, is to provide an abrasive holder attachment for the tool carrier of the filing machine which may be secured to the tool carrier in place of the body file in order that abrasive sheet material such as sandpaper and the like may be reciprocated by means of the filing machine.

Another object of this invention is to provide a fluid actuated filing machine whose movable parts are disposed in communication with a fluid under pressure passing through the filing machine and utilized to actuate the latter whereby the fluid may include lubricating qualities in order that substantially all of the working surfaces of the moving parts of the filing machine may be lubricated continuously during operation of the filing machine.

Yet another object of this invention is to provide a filing machine constructed in a manner whereby the length of the stroke of the tool carrier may be effected, altered by the amount and pressure of fluid passing through the filing machine.

A final object to be specifically enumerated herein is to provide a fluid actuated filing machine which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the filing machine;

FIGURE 2 is a side elevational view of the filing machine;

FIGURE 3 is an end elevational view of the filing machine as seen from the left side of FIGURE 2;

FIGURE 4 is an end elevational view of the filing machine as seen from a right side of FIGURE 2;

FIGURE 5 is an enlarged longitudinal vertical sectional view taken substantially upon the plane indicated by the section line 5—5 of FIGURE 1;

FIGURE 6 is a fragmentary enlarged side elevational view similar to that of FIGURE 2 but with portions of the filing machine being removed and broken away to more clearly illustrate the structural details thereof;

FIGURE 7 is a horizontal sectional view taken substantially upon the plane indicated by section line 7—7 of FIGURE 5;

FIGURE 8 is a transverse vertical sectional view taken substantially upon the plane indicated by the section line 8—8 of FIGURE 5 with parts of the filing machine being broken away;

FIGURE 9 is a transverse vertical sectional view taken substantially upon the plane indicated by the section line 9—9 of FIGURE 5;

FIGURE 10 is a transverse vertical sectional view taken substantially upon the plane indicated by the section line 10—10 of FIGURE 5;

FIGURE 11 is a transverse vertical sectional view on somewhat of an enlarged scale taken substantially upon the plane indicated by the section line 11—11 of FIGURE 5;

FIGURE 12 is a partially exploded perspective view of one of the fluid pressure intake and exhaust valve bodies, portions thereof being broken away and shown in section.

FIGURE 13 is a perspective view of the slide connector rack utilized to drivingly interconnect the pair of pistons of the filing machine for simultaneous and equal reciprocation and one of the removable side plates of the filing machine by which the slide connectior rack is mounted for guided reciprocal movement;

FIGURE 14 is a perspective view of the removable abrasive holder attachment of the filing machine;

FIGURE 15 is a fragmentary top plan view of the filing machine shown with portions thereof being broken away and shown in section;

FIGURE 16 is a fragmentary side elevational view of the rear end of the filing machine, with portions thereof broken away and shown in section;

FIGURE 17 is an enlarged transverse vertical sectional view taken substantially upon the plane indicated by the section line 17—17 of FIGURE 16;

FIGURE 18 is a partially exploded perspective view of a modified form of fluid pressure inlet and exhaust valve body; and FIGURE 19 is a perspective view of an actuator for the valve body illustrated in FIGURE 18 which actuator is carried by the slide connector rack.

Referring now more specifically to the drawings, the numeral 10 generally designates the filing machine of the instant invention which includes a body 12 having removable opposite end walls 14 and 16. A front handle grip 18 is secured to the upper portion of the forward end of the body 12 and a rear hand grip portion 20 is secured to the rear end of the body 12.

With attention now directed to FIGURE 5 of the drawings, it may be seen that the rear hand grip portion 20 is hollow and that it includes a pivoted trigger member 22 which is operatively connected to a valve actuator 24 by means of a tubular rod 26. The valve actuator 24 is reciprocable through a sleeve fitting 28 and its end remote from rod 26 is disposed for engagement with a ball valve member 30 which is spring urged toward a closed position by means of compression spring 32. The sleeve fitting 28, the ball valve member 30 and the compression spring 32 are all housed within the end wall 14 and the end wall 14 is provided with a removable plug 34 whereby the ball valve member 30 and the compression spring 32 may be removed and/or replaced. The end wall 14 includes an inlet fitting 36 to which one end of a flexible fluid pressure line 38 is secured and it is to be understood that the other end of the flexible fluid pressure line 38 is adapted to be connected to any suitable source of fluid under pressure.

The inlet fitting 36 opens into the valve chamber 40 in which the ball valve member 30 and compression spring 32 are disposed and the ball valve member is normally resiliently urged by means of the compression spring 32 into seated engagement with the seat formed in the end wall 14 between the valve chamber 40 and the inlet passage 42 formed in the end wall 14 which has its end remote from the valve chamber 40 registered with a second inlet passage 44 formed in the body 12. The inlet passage 44 extends longitudinally of the body 12 and includes three inlet ports 46, 48 and 50 which open into a longitudinal main bore 52 formed longitudinally of the body 12.

The main bore 52 comprises a pair of opposite end cylinder bores 54 and 56 and an intermediate portion 58 disposed between the adjacent ends of the opposite end of cylinder bores 54 and 56.

The end wall 16 is secured to the body 12 by means of suitable fasteners 60 and the end wall 14 may be secured to the rear end of the body 12 in a similar manner.

The inlet or intake ports 46 and 50 each have an access plug 62 communicated therewith which is secured in a corresponding threaded bore formed in the body 12 and the rear handle portion 20 is secured to the body 12 by means of suitable fasteners 64.

A pair of pistons 66 and 68 are slidingly disposed in the piston bores 54 and 56 and each includes radially outwardly opening groove 70 which extends longitudinally thereof. The grooves 70 open through the remote ends of the pistons 66 and 68 at one end and terminate a spaced distance from the adjacent ends of the pistons 66 and 68. Each of the grooves 70 has a rack gear 72 secured therein by means of suitable fasteners 74 and each piston 66 and 68 includes a pair of lubricating wicks 76.

The confronting ends of the pistons 66 and 68 are each provided with a sealing cup 78, a retaining plate 80 and a yieldable abutment 82. The sealing cups 78 and the retaining plates 80 of each piston are secured thereto by means of a suitable headed fastener 84 which has its shank portion threadedly engaged in the corresponding piston and its head portion 86 received in a corresponding bore formed through the associated bore 88 formed through the associated yieldable abutment 82. It will be noted that the retaining plate 80 maintains the corresponding yieldable abutment in engagement with the associated piston and also that each of the fasteners 84 is laterally spaced from the longitudinal center line of the corresponding piston.

With attention now directed more specifically to FIGURES 5 through 10 of the drawings, it will be seen that the body 12 has a downwardly opening recess 90 formed in its lower surface. The opposite sides of the body 12, adjacent the lower surface thereof are each provided with a plurality of fly cut recesses 92 which open outwardly and are generally circular in plan. The recesses 92 also open through the lower surfaces of the body 12 and the inner ends of each of the recesses 92 includes a blind bore 94. A pair of side plates 96 and 98 are secured to opposite sides of the body 12 adjacent the lower end thereof by means of suitable fasteners 100 and each of the side plates 96 and 98 is generally L-shaped in cross section including an upstanding leg 102 and a laterally inwardly directed lower leg 104. As can best be seen from FIGURE 13 of the drawings, each of the upstanding legs 102 is provided with a plurality of inwardly projecting stub axle members 106 and each stub axle member 106 has a roller 108 journalled thereon.

With attention now directed to FIGURES 5 and 10 of the drawings, it will be seen that the body 12 has a pair of transversely extending axle members 110 secured therethrough and retained in positions by means of the opposite side plates 96 and 98. A gear wheel 112 is rotatably journalled on each axle member 110 and is meshed with the corresponding rack gear 72. An opening 114, see FIGURE 5, is provided in the body 12 for each of the gear wheels 112 communicating the corresponding piston bore with the recess 90 formed in the bottom of the body 12. The gear wheels 112 project through the corresponding openings 114 and are disposed in constant mesh with the rack gears 72 and the rack gear portions 116 carried by opposite ends of the slide connector rack or tool carrier generally referred to by the reference numeral 118 which can best be seen in FIGURE 13 of the drawings.

The opposite side longitudinal edges of the slide connector rack 118 are provided with longitudinal outwardly opening grooves 120 in which the innermost ends of the inturned legs 104 of the side plates 96 and 98 are slidingly received thereby mounting the slide connector rack 118 for guided reciprocal movement longitudinally of the body 12. The gear wheels 112 are in constant mesh with the rack gear portions 116 on the slide connector rack 118 and accordingly, it may be seen that the pistons 66 and 68 are innerconnected for equal and simultaneous reciprocation within piston bores 54 and 56 which comprise opposite end portions of the main bore 52 formed longitudinally through the valve body 12.

It will be noted that the axle members 110 project slightly into the main bore 52 and that the bottom portions of the pistons 66 and 68 are flattened so as to provide clearance for the axle members 110. In this manner, the longitudinal center line of the pistons 66 and 68 is maintained closely adjacent the median plane of the slide connector rack 118.

The slide connector rack 118 is provided with opposite end upwardly opening recesses 124 in which panel-like strips of fiber sealing material 126 are disposed. The sealing strips 126 form a seal between the slide conector rack 118 and the body 12 of the machine 10 and yet provide a means whereby fluid under pressure being exhausted into the center upwardly opening cavity 128 formed in the slide connector rack 118 may pass outwardly of the filing machine 10.

The opposite ends of the slide connector rack 118 are apertured as at 130 and 132 whereby a body file 134 or the like may be secured to the slide connector rack 118 by means of suitable fasteners 136. In addition, with attention now directed to FIGURE 14 of the drawings, an abrasive holder attachment generally referred to by the reference numeral 138 is provided and may be secured to the slide connector rack or tool carrier 118 by means of upstanding threaded shank portions 139 which are carried by the abrasive holder attachment 138 and may be secured through the apertures 130 by means of suitable fasteners.

The abrasive holder attachment 138 includes an elongated panel-like semi-rigid mounting member 140 from which the threaded shank portions 139 project. Pairs of spacer blocks 142 are secured to opposite ends of the mounting member 140 by means of suitable fasteners 144 and it will be noted that a spring clip member 146 is secured to each pair of spacer blocks 142 by means of the same fasteners 144. When the abrasive holder attachment 136 secured to the slide connector rack 118, the opposite ends of a flexible sheet of abrasive material such as sandpaper and the like may be fastened underneath the ends of spring clip members 146 remote from the spacer blocks 142. In this manner, a piece of sandpaper or the like may also be reciprocated over a workpiece by means of the filing machine 10.

With attention again directed to FIGURES 6 through 10 of the drawings, it will be noted that the rollers 108 are disposed in rolling contacting relation with the opposite side upper surfaces 150 and 152 of the slide connector rack 118 thereby providing an anti-friction bearing for the slide connector rack 118 when the filing machine 10 is being pressed downwardly with considerable force on a work surface.

With attention now directed to FIGURES 5 through 12 of the drawings there may be seen a pressure intake and exhaust valve body generally referred to by the reference numeral 160 which is generally cylindrical in configuration. The valve body 160 is secured within the main bore 52 between the pistons 66 and 68 by means of a set screw 162 which passes through the intake port 48 and engages the valve body 160. The valve body 160 is provided with a pair of longitudinal bores 164 and 166 and a pair of transverse bores 168 and 170 which are communicated with the longitudinal bores 164 and 166 respectively. Generally cylindrical valve members 172 and 174 are reciprocable in the bores 164 and 166 respectively and each includes a diametric passage 176 and a pair of longitudinally spaced and oppositely laterally opening notches 178 and 180. The notches 178 are inlet notches and the notches 180 are outlet notches. A pair of slots 182 are formed in each valve body 160 and removable keeper plates 184 are secured in the slots 182 and have their inner ends disposed within elongated notches 186 formed in the valve members 172 and 174. The keeper plates 184 define limits for reciprocation of the valve members 172 and 174 by engagement of the opposite ends of the notches 186 formed in the valve members 172 and 174 with the keeper plates 184.

The upper ends of the transverse bores 168 and 170 are registered with the inlet ports 46 and 50. In operation, the valve members 172 and 174 serve to alternatively admit fluid under pressure into and vent the piston bores 56 and 54 respectively. As the piston 66 moves to the psoition illustrated in FIGURE 5 of the drawings, the valve members 172 and 174 are urged to the right by means of the yieldable abutment 82 carried by the piston 66. The movement of the valve members 172 and 174 to the right as viewed in FIGURE 5 communicates the notch 180 with the bore 168 disposed below the valve member 172 and thus communicate the interior of the piston bore 56 with the ambient atmosphere by means of the bore 168 and the outlet port 188 formed in the valve body 12 between the main bore 52 and the recess 90. At the same time, the valve member 174 is urged to the right as viewed in FIGURE 5 and has its notch 178 communicated with the upper end of the transverse bore 170. The movement of the valve member 174 to the right as viewed in FIGURE 5 thereby communicates the inlet port 50 with which the upper end of the bore 170 is registered with the interior of the piston bore 54. Accordingly, fluid under pressure will enter the cylinder bore 54 between the piston 66 and the valve body 160 and urge the piston 66 to the left. Inasmuch as the piston bore 56 is communicated with the ambient atmosphere and is thereby vented, movement of the piston 68 to the left as viewed in FIGURE 5 will force the expanded fluid out of the piston bore 56 and through the bottom of the filing machine 10 and into the ambient atmosphere. Then, as the yieldable abutment 82 of the piston 68 engages the extended ends of the valve members 172 and 174 to urge the valve members to the left as viewed in FIGURE 5 of the drawings, the notch 180 of the valve member 172 is moved out of registry with the lower end of the bore 168 and the notch 178 thereof is moved into registry with the upper end of bore 168 which is registered with the inlet port 46. Additionally, the notch 178 of the valve member 174 will be moved out of registry with the upper end of the bore 170 and the notch 180 of the valve member 174 will be moved into registry with the lower end of the bore 170 in order to vent the interior of the piston bore 54 to the ambient atmosphere.

As soon as the notches 178 of the valve members 172 and 174 are slightly registered with the upper ends of the bores 168 and 170, the inrushing fluid under pressure through the valve members 172 and 174 will urge the latter further toward their full inlet positions whereby the valve members 172 and 174 are not solely dependent upon engagement thereof by the pistons 66 and 68 for movement toward the full inlet positions. Accordingly, low speed operation of the filing machine 10 by the use of fluid under moderate pressure will effect shorter strokes of the pistons 66 and 68 and thus shorter strokes of the slide connector rack 118.

Thus, it may be seen that when the pistons 66 and 68 are moving forwardly the slide connector rack 118 is moving rearwardly. The weight of the slide connector rack 118 and the tool such as the file 134 secured thereto is predetermined so that a movement of the pistons 66 and 68 in a direction opposite to the slide connector rack 118 will maintain the machine 10 in proper balance. This, of course, will greatly reduce the tendency of the machine 10 to vibrate even while operating at high speeds.

With attention now directed to FIGURES 15 through 19 of the drawings, there will be seen a modified form of valve body generally referred to by the reference numeral 190 which has a single diametric bore 192 formed therethrough in which there is secured a sleeve 194.

As the valve bodies 160 and 190 are interchangeable the valve body 190 is shown in FIGURES 15 through 17 secured within the machine 10 in lieu of the valve body 160.

The valve body 190 is secured within the bore 52 by means of the lower end of the sleeve 194 which is received in a bore communicating the main bore 52 and the recess 90, which bore is designated by the reference numeral 196. Other than the interchanging of the valve bodies 160 and 190, only two changes need to be made to the filing machine 10 in order that the valve body 190 may be used in lieu of the valve body 160. The first change involves the removal of the set screw 162 and its replacement by a shorter set screw 200 in order that the inlet passage 48 be unobstructed. The upper end of the sleeve 194 is registered with the inlet passage 48 and the sleeve 194 is provided with two pair of diametrically aligned slots 202 which are registered with the longitudinal bores 204 and 206 formed through the valve body 190. The valve member for the valve body 190 is generally referred to by the reference numeral 208 and includes a cylindrical shank portion 210 and a diametrically enlarged disk-shaped head portion 212 having a pair of flats 214 formed thereon with a V-shaped notch 216 formed between the two flats 214 on the head portion 212. The valve member 208 is provided with a longitudinal bore or passage 218 and two pair of right angularly disposed slots 220 and 222 and 224, 226.

The second modification of the filing machine 10 required to enable the valve body 190 to be used in lieu of the valve body 160 is the addition of an actuator generally referred to by the reference numeral 228 secured to the slide connector rack 118 by means of a plurality of fasteners 230 secured through the apertures 232 formed in the horizontal leg 234 of the actuator 228. The actuator 228 includes an upstanding leg 236 and it may be seen that the actuator 228 is generally L-shaped in cross section. An actuator block or cam 238 is formed integrally with the leg 236 and is seated within the notch 216 during operation of the valve body 190. The flats 214 are provided for abutting against the inner surface of leg 236 of the actuator 228 to limit the oscillatory movement of the valve member 208 to that of approximately 90° of rotation.

The bore 218 does not extend entirely through the valve member 208 but is divided into upper and lower halves which are separated by web 219. The slots 220 and 222 define inlet slots and the slots 224 and 226 define outlet slots. Accordingly, it may be seen that the longitudinal bore 204, with which the slots 220 and 222 are registrable, defines an inlet passage while the bore 206, which slots 224 and 226 are registrable defines an outlet passage. In operation, as the slide connector rack 118 moves to the extreme left position in FIGURE 16, the pistons 66 and 68 are positioned at the limit of their travel to the right. In this position, the inlet slot 222 is registered with the bore 204 and thereby communicated with piston bore 56 whereupon fluid under pressure is admitted into the piston bore 56 through the upper end of the bore 18, the slot 222 and the bore 204.

At the same time, the slot 224 is registered with the bore 206 whereupon the piston bore 54 is vented to the ambient atmosphere by means of the bore 206, slot 224, the lower end of the bore 218 and the recess 90. As the fluid pressure within the piston bore 56 moves the pistons 66 and 68 to the left as viewed in FIGURE 16 of the drawings, the block or cam 238 will again engage the notch 216 and rotate the valve member 208 one quarter turn moving the slot 222 out of registry with the bore 204 and the slot 220 in registry with the bore 204. In addition, the slot 224 will be moved out of registry with the bore 206 while the slot 226 is moved into registry with the bore 206 thereby terminating communication of the piston bore 54 with the ambient atmosphere and venting the piston bore 56 to the ambient atmosphere. At the same time, communication between the inlet port 48 and the piston bore 56 is terminated and communication between the inlet portion 48 and the piston bore 54 is established.

Accordingly, it may be seen that the valve body 190 may be substituted in the machine 10 in place of the valve body 160 with only two minor modifications being made to the machine 10. Inasmuch as the valve bodies 160 and 190 provide only different methods for admitting fluid under pressure into the piston bores and for venting the piston bores to the ambient atmosphere, the operation of the machine 10 remains the same regardless of which valve body is being used with the exception that the valve body 160 has inherent means for moving the valve members to the full inlet positions independently of movement of the pistons 66 and 68 once the valve members 172 and 174 have been moved to partial inlet positions.

In FIGURE 14 there may be seen a key 242 which may have its shank portion 244 alternately inserted beneath the free ends of the spring clip members 146 and twisted in order to cam the free ends of members 146 away from the adjacent surface of the mounting member 140 in order that the opposite ends of a strip of sand paper beneath the clip members 146.

With final reference to the specific operation of the machine 10, the pistons 66 and 68 are reciprocated in a like manner and inversely relative to the tool carrier 118. The pistons are proportionally lighter than the tool carrier and the tool secured thereto and preferably weigh about three to five ounces. The thrust of the pistons is transmitted through the rack and pinion gears to the tool carriers moving in the opposite direction to the pistons. There is also a thrust equal to that exerted on the piston being simultaneously exerted upon the stationary valve body 160 intermediate of the bores 54 and 56 and thus upon the tool body 12. This thrust upon the tool body is in the same direction as the movement of the tool carrier. Therefore, the reciprocatory vibration of the tool body 12 is directed in the same direction as the tool movement providing a very smooth running nonbucking filing machine. When it is necessary to push down on the filing machine body in a filing operation, any bucking of the tool produced is in the same direction as the tool movement and consequently assists in the filing operation.

Also, it should be noted that in accordance with the present construction, the piston 66 and 68, because of the grooves 70, are journaled within the bores 54 and 56, respectively, only at their ends near the center of the tool body where the fluid pressure inlets of the valve body 160 are disposed. The force exerted on each piston from the center of the body tends to rotate the pistons about their journaled ends to push the outer ends thereof down on the pinions 112. The downward force exerted by the outer ends of the pistons upon the pinions 112 insures a positive non-chattering operation of the pinions on the tool carrier rack, indicated generally at 118.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including a rack gear portion meshed with said gear wheels thereby interconnecting said pistons for simultaneous movement.

2. The combination of claim 1 wherein said slide connector rack includes portions disposed exteriorly of said body and having means thereon adapted to have a reciprocal cutting tool removably secured thereto.

3. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including rack gear portion meshed with said gear wheels thereby interconnecting said pistons for simultaneous movement, said piston rack gear portions each generally paralleling the direction of movement of the corresponding piston and being inwardly of the outer peripheral surfaces thereof.

4. The combination of claim 3 wherein said rack gear portions are disposed in generally radially outwardly opening and longitudinally extending grooves formed in said pistons.

5. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including rack gear portion meshed with said gear wheels thereby interconnecting said pistons for simultaneous movement, said slide connector rack includes portions disposed exteriorly of said body having means thereon adapted to have a reciprocal cutting tool removably secured thereto, and including an abrasive holder attachment removably secured to said portions of said slide connector rack.

6. The combination of claim 5 wherein said abrasive holder attachment includes means adapted to releasably secure a flexible sheet of abrasive material thereto.

7. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including rack gear portion meshed with said gear wheels thereby interconnecting said pistons for simultaneous movement, said slide connector rack includes portions disposed exteriorly of said body having means thereon adapted to have a reciprocal cutting tool removably secured thereto, and the axes of rotation of said gear wheels lying on chords of said bores.

8. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including rack gear portion meshed with said gear wheels thereby interconnecting said pistons for simultaneous movement, and said bores being aligned end to end and said fluid pressure intake and exhaust means including a body disposed between said bores and communicated therewith, said valve means including movable valve member means reciprocal relative to said body between positions with portions of said valve member means alternately engageable and actuated by said pistons upon their movement toward said body.

9. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including rack gear portion meshed with said gear wheels thereby interconnecting said pistons for simultaneous movement and said bores being aligned end to end and said fluid pressure intake and exhaust means including a body disposed between said bores and communicated therewith, said valve means including movable valve member means oscillatable between positions alternately admitting fluid under pressure into and venting alternate ones of said bores and operatively connected to said pistons for oscillation thereby in direct response to reciprocation of said pistons.

10. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including rack gear portion meshed with said gear wheels thereby interconnecting said pistons for simultaneous movement, and said bores being aligned end to end and said fluid pressure intake and exhaust means including a body disposed between said bores and communicated therewith, said valve means including movable valve member means reciprocal relative to said body between positions with portions of said valve member means alternately engageable and actuated by said pistons upon their movement toward said body, said slide connector rack including portions disposed exteriorly of said body having means thereon adapted to have a reciprocal cutting tool removably secured thereto.

11. A fluid actuated device comprising a body defining a pair of cylinder bores, a pair of separate pistons reciprocal in said bores and connected together for simultaneous reciprocation, fluid pressure intake and exhaust means communicated with one pair of ends of said bores including movable valve means operable in direct response to reciprocation of said pistons for alternately admitting fluid under pressure into said bores and venting said bores to the ambient atmosphere in timed sequence with the reciprocation of said pistons, said pistons each including a rack gear portion, said body including a pair of gear wheels journalled for rotation about axes extending transversely of said bores and disposed in constant meshing engagement with said rack gear portions, a slide connector rack guidingly supported from said body for reciprocal movement and including rack gear portion meshed with said gear wheels thereby interconnecting said pistons for simultaneous movement and said bores being aligned end to end and said fluid pressure intake and exhaust means including a body disposed between said bores and communicated therewith, said valve means including movable valve member means oscillatable between positions alternately admitting fluid under pressure into and venting alternate ones of said bores and operatively connected to said pistons for oscillation thereby in direct response to reciprocation of said pistons, said slide connector rack including portions disposed exteriorly of said body having means thereon adapted to have a reciprocal cutting tool removably secured thereto.

12. A fluid pressure operated device comprising a body defining a pair of bores therein, a pair of pistons reciprocal in said bores, fluid pressure intake and exhaust means communicated with said bores and including valve means operable in response to reciprocation of the pistons for alternately admitting fluid under pressure into said bores and venting said bores to the ambient atmosphere, a tool carrier means reciprocally supported from the body, and means interconnecting each of said pistons and the tool carrier means for drivingly interconnecting the pistons with the tool carrier means, said interconnecting means including means for reversing the direction of reciprocation of the tool carrier means in relation to the pistons whereby the two pistons move simultaneously in one direction while the tool carrier moves in the other direction.

13. A fluid pressure actuated device comprising a body having a pair of bores therein, a piston movable in each bore, a tool carrier means reciprocally mounted on the body for movement in generally parallel relation to the pistons, and means interconnecting the pistons and tool carrier means for reciprocating the tool carrier means in response to reciprocation of the pistons, said means interconnecting the piston and tool carrier means including means engaging the piston and carrier means at longitudinally movable points thereon during reciprocation of the pistons and tool carrier means.

14. The structure as defined in claim 13 wherein said valve body includes an exhaust means directing exhaust fluid towards the tool carrier for maintaining the tool carrier in a clean condition, and lubricating means associated with the fluid pressure discharge for introducing lubricant to the moving parts of the device.

15. A fluid pressure actuated device comprising a body having a pair of bores therein, a piston reciprocal in each bore, tool carrier means reciprocally mounted on the body, and means interconnecting the piston and tool carrier means whereby the pistons move in the same direction together but in an opposite direction to the tool carrier means, said means interconnecting the piston and tool carrier means including gear means meshing with rack means on the pistons and tool carrier means with the gear means engaging the rack means on the pistons at a point remote from the application of force thereon.

References Cited by the Examiner

UNITED STATES PATENTS

| | | | |
|---|---|---|---|
| 2,120,300 | 6/38 | Taylor | 121—3 |
| 2,224,132 | 12/40 | Barnes | 121—3 |
| 2,255,395 | 9/41 | Spink | 121—3 |
| 2,598,480 | 5/52 | Wright. | |
| 2,648,121 | 8/53 | Tansey. | |
| 2,666,978 | 1/54 | Skillman. | |
| 2,722,917 | 11/55 | Geller | 121—3 |
| 2,835,957 | 5/58 | Lacson. | |

FOREIGN PATENTS

| | | |
|---|---|---|
| 95,939 | 2/24 | Austria. |
| 138,398 | 5/30 | Switzerland. |

ANDREW R. JUHASZ, *Primary Examiner.*

WILLIAM W. DYER, JR., *Examiner.*